US012791710B2

(12) United States Patent
Kashiwase et al.

(10) Patent No.: US 12,791,710 B2
(45) Date of Patent: Nov. 10, 2026

(54) ELECTROMAGNETIC-WAVE DETECTION APPARATUS

(71) Applicant: KYOCERA Corporation, Kyoto (JP)

(72) Inventors: Susumu Kashiwase, Machida (JP); Tsuneyasu Inukai, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 954 days.

(21) Appl. No.: 18/040,202

(22) PCT Filed: Aug. 4, 2021

(86) PCT No.: PCT/JP2021/028977

§ 371 (c)(1),
(2) Date: Feb. 1, 2023

(87) PCT Pub. No.: WO2022/030555

PCT Pub. Date: Feb. 10, 2022

(65) Prior Publication Data

US 2023/0314608 A1 Oct. 5, 2023

(30) Foreign Application Priority Data

Aug. 5, 2020 (JP) ................................ 2020-133326

(51) Int. Cl.
*G01S 17/08* (2006.01)
*G01S 7/4865* (2020.01)
(Continued)

(52) U.S. Cl.
CPC ............ *G01S 17/08* (2013.01); *G01S 7/4865* (2013.01); *G01S 17/89* (2013.01); *G01S 17/931* (2020.01)

(58) Field of Classification Search
None
See application file for complete search history.

(56) References Cited

U.S. PATENT DOCUMENTS 7,453,552 B1 * 11/2008 Miesak .................. G01S 7/497 356/5.01
10,436,907 B1 * 10/2019 Murray .................. G01S 17/95
(Continued)

FOREIGN PATENT DOCUMENTS

JP H05-066263 A 3/1993
JP 2000-266852 A 9/2000
(Continued)

*Primary Examiner* — Yuqing Xiao
*Assistant Examiner* — Clint Thatcher
(74) *Attorney, Agent, or Firm* — Studebaker Brackett PLLC

(57) ABSTRACT

Provided is an electromagnetic-wave detection apparatus capable of performing accurate detection of an electromagnetic wave. An electromagnetic-wave detection apparatus (10) includes a radiation system (111) configured to radiate an electromagnetic wave toward a space in which a target is present, a first detection unit (20) configured to detect a reflected wave that is the electromagnetic wave radiated by the radiation system and reflected by the target, a calculation unit (145) configured to calculate a distance to the target on the basis of detection information that is obtained by the first detection unit and that relates to the reflected wave, and a radiation control unit (143) configured to cause the radiation system to radiate the electromagnetic wave. The radiation control unit causes a first electromagnetic wave to be radiated and then causes a second electromagnetic wave with a greater output than the first electromagnetic wave to be radiated. The calculation unit calculates the distance to the target on the basis of the reflected wave of the first electromagnetic wave when the first detection unit becomes saturated with the reflected wave of the second electromagnetic wave.

14 Claims, 9 Drawing Sheets

(51) Int. Cl.

| | |
|---|---|
| ***G01S 17/89*** | (2020.01) |
| ***G01S 17/931*** | (2020.01) |

(56) References Cited

U.S. PATENT DOCUMENTS

| | | | | |
|---|---|---|---|---|
| 10,627,490 | B2 | 4/2020 | Hall et al. | |
| 2007/0058038 | A1* | 3/2007 | David | G01S 7/483 348/135 |
| 2014/0071428 | A1 | 3/2014 | Suzuki et al. | |
| 2017/0146647 | A1* | 5/2017 | Lim | G01S 7/352 |
| 2019/0196020 | A1* | 6/2019 | Aceti | G01S 7/4815 |
| 2020/0200910 | A1 | 6/2020 | Pan et al. | |
| 2022/0206146 | A1* | 6/2022 | Beer | G01S 17/894 |

FOREIGN PATENT DOCUMENTS

| | | | |
|---|---|---|---|
| JP | 2008-275331 | A | 11/2008 |
| JP | 2017-020841 | A | 1/2017 |
| JP | 2019-507340 | A | 3/2019 |
| JP | 2019-120515 | A | 7/2019 |

* cited by examiner

ELECTROMAGNETIC-WAVE DETECTION APPARATUS

CROSS-REFERENCE TO RELATED APPLICATIONS

The present application claims the priority of Japanese Patent Application No. 2020-133326 filed on Aug. 5, 2020, the disclosure of which is hereby incorporated by reference in its entirety.

TECHNICAL FIELD

The present disclosure relates to an electromagnetic-wave detection apparatus.

BACKGROUND OF INVENTION

In recent years, an apparatus that acquires information relating to surroundings from detection results obtained by a plurality of detectors configured to detect electromagnetic waves has been developed. Such an apparatus may sometimes detect, for example, a distance to a subject by acquiring an image including the subject captured by an imaging device and detecting electromagnetic waves including a reflected wave reflected by the subject. Here, a reflected wave came from a distant place is weak, and consequently, a highly sensitive detector is required. In contrast, a reflected wave came from a nearby place is extremely strong, and consequently, it saturates a detector and becomes a cause of measurement errors. Accordingly, for example, the apparatus disclosed in Patent Literature 1 radiates two types of laser beams, which are strong and weak laser beams, and when a detector included in the apparatus becomes saturated, the apparatus performs distance measurement using reflection of light emitted from a low-power laser oscillator included in the apparatus.

CITATION LIST

Patent Literature

Patent Literature 1: Japanese Unexamined Patent Application Publication No. 5-066263

SUMMARY

According to an embodiment of the present disclosure, an electromagnetic-wave detection apparatus includes a radiation system, a first detection unit, a calculation unit, and a radiation control unit. The radiation system radiates an electromagnetic wave toward a space in which a target is present. The first detection unit detects a reflected wave that is the electromagnetic wave radiated by the radiation system and reflected by the target. The calculation unit calculates a distance to the target based on detection information that is obtained by the first detection unit and that relates to the reflected wave. The radiation control unit causes the radiation system to radiate the electromagnetic wave. The radiation control unit causes a first electromagnetic wave to be radiated and then causes a second electromagnetic wave with a greater output than the first electromagnetic wave to be radiated. The calculation unit calculates the distance to the target based on the reflected wave of the first electromagnetic wave when the first detection unit becomes saturated with the reflected wave of the second electromagnetic wave.

DESCRIPTION OF EMBODIMENTS

Figure 1:
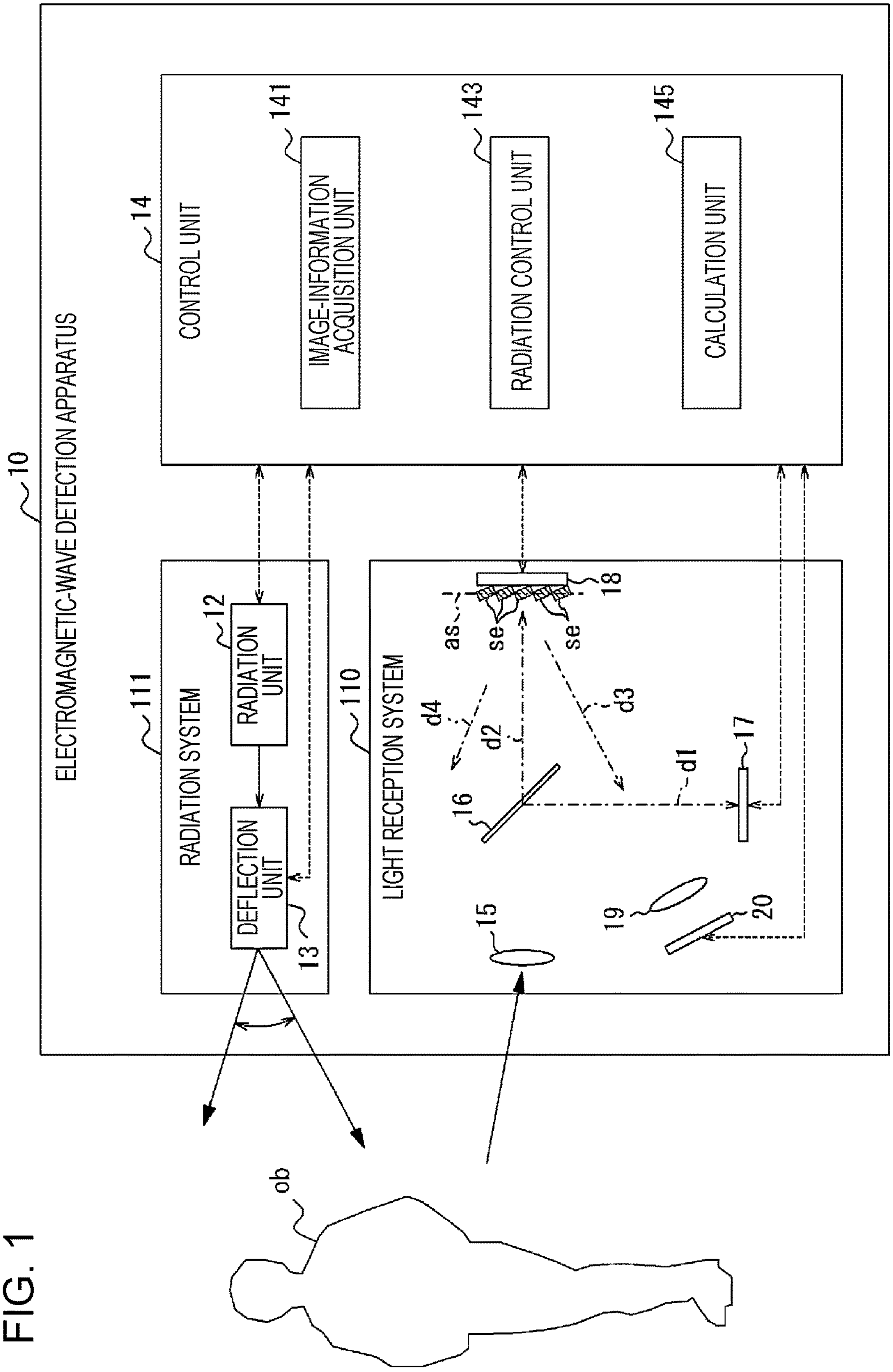
FIG. 1 is a diagram illustrating a schematic configuration of an electromagnetic-wave detection apparatus according to an embodiment.

FIG. 1 is a diagram illustrating a schematic configuration of an electromagnetic-wave detection apparatus 10 according to an embodiment. The electromagnetic-wave detection apparatus 10 includes a radiation system 111, a light reception system 110, and a control unit 14. In the present embodiment, the distance-measurement apparatus 10 functions as a distance-measurement apparatus. In the present embodiment, although the electromagnetic-wave detection apparatus 10 includes the single radiation system 111 and the single light reception system 110, the electromagnetic-wave detection apparatus 10 may include multiple light reception systems 110 and multiple radiation systems 111, and the multiple light reception systems 110 may correspond to their respective radiation systems 111.

The radiation system 111 includes a radiation unit 12 and a deflection unit 13. The light reception system 110 includes an incident unit 15, a separation unit 16, a first detection unit 20, a second detection unit 17, a switching unit 18, and a first subsequent-stage optical system 19. The control unit 14 includes an image-information acquisition unit 141, a radiation control unit 143, and a calculation unit 145. Details of each functional block of the electromagnetic-wave detection apparatus 10 will be described later.

In the drawings, dashed lines connecting the functional blocks each indicate a flow of a control signal or a flow of information that is transmitted and received. Each of the communications indicated by the dashed lines may be wired communication or may be wireless communication. In the drawings, solid arrows each indicate an electromagnetic wave in the form of a beam, and an object ob is a subject of the electromagnetic-wave detection apparatus 10. The subject may include, for example, objects such as a road, a median strip, a sidewalk, a roadside tree, and a vehicle and may include a person. There may be one or more objects ob.

The electromagnetic-wave detection apparatus 10 acquires an image including the subject and is capable of identifying the subject by detecting a reflected wave reflected by the subject. The electromagnetic-wave detection apparatus 10 includes the calculation unit 145 that measures a distance to the object ob, and the electromagnetic-wave detection apparatus 10 functions as a distance-measurement apparatus as mentioned above.

(Radiation System)

The radiation system 111 radiates an electromagnetic wave into a space in which the object ob is present. In the present embodiment, the radiation system 111 radiates an electromagnetic wave radiated by the radiation unit 12 toward the space in which the object ob is present via the deflection unit 13. As another example, the radiation system 111 may have a configuration in which the radiation unit 12 directly radiates an electromagnetic wave toward the object ob.

The radiation unit 12 radiates at least one of an infrared ray, a visible light ray, an ultraviolet ray, and a radio wave. In the present embodiment, the radiation unit 12 radiates an infrared ray. In addition, in the present embodiment, the radiation unit 12 radiates an electromagnetic wave in the form of a narrow beam of, for example, 0.5 degrees. The radiation unit 12 radiates the electromagnetic wave in pulses. The radiation unit 12 may include, for example, a light emitting diode (LED) as an electromagnetic-wave radiation element. Alternatively, the radiation unit 12 may include, for example, a laser diode (LD) as an electromagnetic-wave radiation element. The radiation unit 12 is switched to perform radiation of an electromagnetic wave and to stop radiation of the electromagnetic wave under control of the control unit 14. Here, the radiation unit 12 may form an LED array or an LD array that includes multiple electromagnetic-wave radiation elements arranged in an array and may radiate multiple beams simultaneously.

The deflection unit 13 causes the electromagnetic wave radiated by the radiation unit 12 to be output in different directions so as to change a position to be irradiated with the electromagnetic wave, which is radiated into the space in which the object ob is present. The deflection unit 13 may cause the electromagnetic wave to be output in different directions by reflecting the electromagnetic wave from the radiation unit 12 while changing the orientation of the deflection unit 13. For example, the deflection unit 13 causes the electromagnetic wave radiated by the radiation unit 12 to scan the object ob in a one-dimensional direction or a two-dimensional direction. Here, if the radiation unit 12 is configured as, for example, an LD array, the deflection unit 13 may reflect all the multiple beams that are output by the LD array so as to cause them to be output in the same direction. In other words, the radiation system 111 may include the single deflection unit 13 for the radiation unit 12 that includes one or more electromagnetic-wave radiation elements.

The deflection unit 13 is configured such that at least a portion of an irradiation region that is a space to which an electromagnetic wave is output is included in an electromagnetic-wave detection range of the light reception system 110. Thus, at least part of an electromagnetic wave that is radiated into the space in which the object ob is present via the deflection unit 13 is reflected by at least a portion of the object ob and may be detected by the light reception system 110. Here, an electromagnetic wave that is a radiation wave reflected by at least a portion of the object ob will hereinafter be referred to as a reflected wave. The radiation wave is an electromagnetic wave that is radiated from the radiation system 111 in multiple directions in the space in which the object ob is present.

The deflection unit 13 includes, for example, a microelectromechanical systems (MEMS) mirror, a polygon mirror, and a galvanometer mirror. In the present embodiment, the deflection unit 13 includes a MEMS mirror.

The deflection unit 13 changes a direction in which the deflection unit 13 reflects an electromagnetic wave under control of the control unit 14. The deflection unit 13 may include an angle sensor such as, for example, an encoder and may notify the control unit 14 of an angle that is detected by the angle sensor as direction information regarding a direction in which the electromagnetic wave is reflected. In such a configuration, the control unit 14 may calculate an irradiation position of an electromagnetic wave on the basis of the direction information received from the deflection unit 13. The control unit 14 may also calculate the irradiation position on the basis of a drive signal that is input in order to cause the deflection unit 13 to change the direction in which the deflection unit 13 reflects the electromagnetic wave.

(Light Reception System)

In the following description, the phrase "electromagnetic waves including a reflected wave" refers to electromagnetic waves that include a reflected wave reflected by the object ob and that are incident on the light reception system 110. In other words, electromagnetic waves that are incident on the light reception system 110 may sometimes be referred to as "electromagnetic waves including a reflected wave" in order to distinguish them from the radiation wave. The electromagnetic waves including a reflected wave include not only the reflected wave, which is the electromagnetic wave that is radiated by the radiation system 111 and reflected by the object ob, but also outside light, such as sunlight, and light that is outside light reflected by the object ob.

The incident unit 15 is an optical system including at least one optical element and forms an image of the object ob, which is the subject. The optical element includes, for example, at least one selected from the group consisting of a lens, a mirror, a diaphragm, an optical filter, and the like.

The separation unit 16 is disposed between the incident unit 15 and a first image-forming position that is a position where the incident unit 15 forms an image of the object ob. The separation unit 16 separates the electromagnetic waves including a reflected wave in accordance with their wavelengths in such a manner that each wave travels in a first direction d1 or a second direction d2. The separation unit 16 may separate the electromagnetic waves including a reflected wave into the reflected wave and the other electromagnetic waves. The other electromagnetic waves may include, for example, light such as visible light.

In the present embodiment, the separation unit 16 reflects part of the electromagnetic waves including a reflected wave in the first direction d1 and enables another part of them to pass therethrough in the second direction d2. In the present embodiment, the separation unit 16 reflects, in the first direction d1, visible light that is environmental light, such as sunlight, reflected by the object ob. The separation unit 16 enables an infrared ray radiated by the radiation unit 12 and reflected by the object ob to pass therethrough in the second direction d2. As another example, the separation unit 16 may enable part of the electromagnetic waves including a reflected wave to pass therethrough in the first direction d1 and may reflect another part of the electromagnetic waves including a reflected wave in the second direction d2. The separation unit 16 may refract part of the electromagnetic waves including a reflected wave in the first direction d1 and may refract another part of the electromagnetic waves including a reflected wave in the second direction d2. Examples of the separation unit 16 include a half mirror, a beam splitter, a dichroic mirror, a cold mirror, a hot mirror, a metasurface, a deflection element, and a prism.

The second detection unit 17 is disposed on a path of an electromagnetic wave that travels in the first direction d1 from the separation unit 16. The second detection unit 17 is disposed at an image-forming position in the first direction d1 where an image of the object ob is formed or is disposed in the vicinity of this image-forming position. The second detection unit 17 detects an electromagnetic wave that has travelled in the first direction d1 from the separation unit 16.

The second detection unit 17 may be disposed with respect to the separation unit 16 in such a manner that a first travelling axis of the electromagnetic wave that travels in the first direction d1 from the separation unit 16 is parallel to a first detection axis of the second detection unit 17. The first travelling axis is the central axis of an electromagnetic wave that travels in the first direction d1 from the separation unit 16 and that propagates while spreading radially. In the present embodiment, the first travelling axis is an axis that is obtained by extending an optical axis of the incident unit 15 to the separation unit 16 and bending the optical axis at the separation unit 16 to make it parallel to the first direction d1. The first detection axis is an axis that passes through the center of a detection surface of the second detection unit 17 and that is perpendicular to the detection surface.

The second detection unit 17 may be disposed in such a manner that the gap between the first travelling axis and the first detection axis is equal to or less than a first gap threshold. Alternatively, the second detection unit 17 may be disposed in such a manner that the first travelling axis and the first detection axis coincide with each other. In the present embodiment, the second detection unit 17 is disposed in such a manner that the first travelling axis and the first detection axis coincide with each other.

The second detection unit 17 may be disposed with respect to the separation unit 16 such that a first angle formed by the first travelling axis and the detection surface of the second detection unit 17 is equal to or less than a first-angle threshold or such that the first angle is the same as a predetermined angle. In the present embodiment, the second detection unit 17 is disposed in such a manner that the first angle is 90 degrees.

In the present embodiment, the second detection unit 17 is a passive sensor. Specifically, in the present embodiment, the second detection unit 17 includes an element array. For example, the second detection unit 17 includes an imaging device such as an image sensor or an imaging array and captures an image formed by an electromagnetic wave focused at the detection surface so as to generate image information of a space including the captured object ob.

In the present embodiment, the second detection unit 17 is configured to detect light from a space, and more specifically, the second detection unit 17 captures a visible-light image. The second detection unit 17 outputs generated image information of the space as a signal to the control unit 14. The second detection unit 17 may capture images, such as an infrared-ray image, an ultraviolet-ray image, and a radio-wave image, other than a visible-light image.

The switching unit 18 is disposed on a path of an electromagnetic wave that travels in the second direction d2 from the separation unit 16. The switching unit 18 is disposed at a first image-forming position in the second direction d2 where an image of the object ob is formed or is disposed in the vicinity of this first image-forming position.

In the present embodiment, the switching unit 18 is disposed at the first image-forming position. The switching unit 18 has an action surface as on which an electromagnetic wave that has passed through the incident unit 15 and the separation unit 16 is incident. The action surface as is formed of multiple switching elements se arranged two-dimensionally. The action surface as is a surface that produces actions such as, for example, reflection and transmission of an electromagnetic wave, in at least one of a first state and a second state, which will be described below.

The switching unit 18 can switch the state of each of the switching elements se between the first state in which the switching element se causes an electromagnetic wave that is incident on the action surface as to travel in a third direction d3 and the second state in which the switching element se causes the electromagnetic wave to travel in a fourth direction d4. In the present embodiment, the first state is a first reflective state in which an electromagnetic wave that is incident on the action surface as is reflected in the third direction d3. The second state is a second reflective state in which the electromagnetic wave, which is incident on the action surface as, is reflected in the fourth direction d4.

More specifically, in the present embodiment, each of the switching elements se of the switching unit 18 has a reflective surface at which an electromagnetic wave is reflected. The switching unit 18 switches the state of each of the switching elements se between the first reflective state and the second reflective state by arbitrarily changing the orientation of the reflective surface of the switching element se.

In the present embodiment, the switching unit 18 includes, for example, a digital micro-mirror device (DMD). The DMD can switch the state of the reflective surface of each of the switching elements se between a state in which the reflective surface is inclined at +12 degrees with respect to the action surface as and a state in which the reflective surface is inclined at −12 degrees with respect to the action surface as by driving a micro-reflective surface included in the action surface as. The action surface as is parallel to a plate surface of a substrate of the DMD on which the micro-reflective surface is placed.

Figure 2:
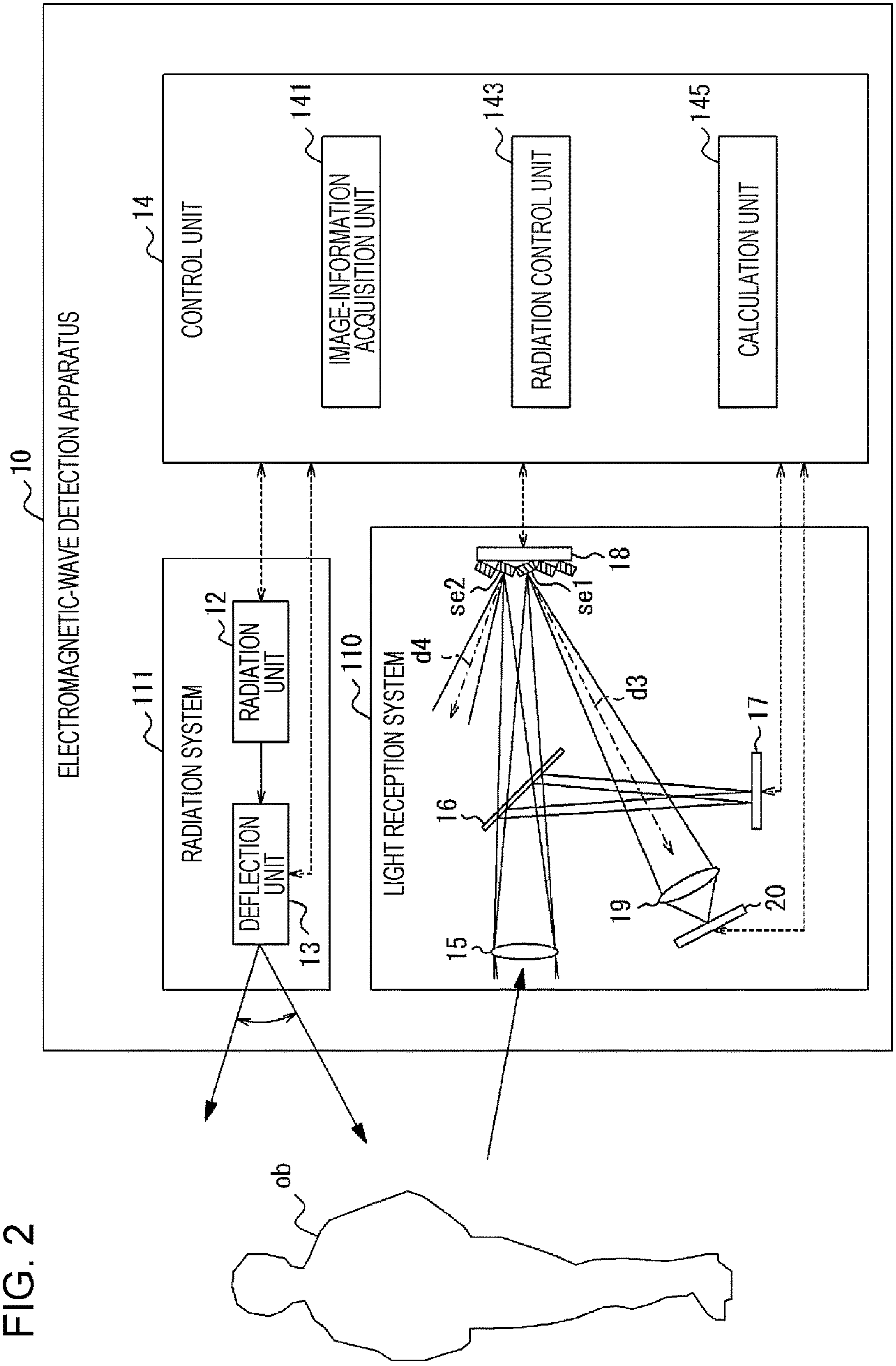
FIG. 2 is a diagram illustrating a travelling direction of an electromagnetic wave in a first state and a travelling direction of an electromagnetic wave in a second state in the electromagnetic-wave detection apparatus illustrated in FIG. 1.

The switching unit 18 switches the state of each of the switching elements se between the first state and the second state under control of the control unit 14. As illustrated in FIG. 2, for example, the switching unit 18 may cause an electromagnetic wave that is incident on switching elements se1, which are some of the switching elements se, to travel in the third direction d3 by switching the states of the switching elements se1 to the first state simultaneously and may cause an electromagnetic wave that is incident on a switching element se2, which is one of the switching elements se and which is different from the switching elements se1, to travel in the fourth direction d4 by switching the state of the switching element se2 to the second state. More specifically, the control unit 14 detects a radiation direction of an electromagnetic wave or an irradiation position of the electromagnetic wave on the basis of direction information received from the deflection unit 13. Then, the control unit 14 brings one of the switching elements se1 that corresponds to the radiation direction of the electromagnetic wave or the irradiation position of the electromagnetic wave, which has been detected, into the first state and brings the rest of the switching elements se1 into the second state so as to selectively cause a reflected wave from the object ob to travel in the third direction d3. Among the electromagnetic waves that have passed through the separation unit 16, the electromagnetic waves excluding a reflected wave from the object ob travel in the fourth direction d4 and thus will not be incident on the first detection unit 20.

As illustrated in FIG. 1, the first subsequent-stage optical system 19 is disposed in the third direction d3 from the switching unit 18. The first subsequent-stage optical system 19 includes, for example, at least one of a lens and a mirror.

The first subsequent-stage optical system 19 focuses an electromagnetic wave whose travelling direction has been switched by the switching unit 18 so as to form an image of the object ob.

The first detection unit 20 is disposed at a position at which the first detection unit 20 can detect an electromagnetic wave that is caused by the switching unit 18 to travel in the third direction d3 and then to further travel by passing through the first subsequent-stage optical system 19. The first detection unit 20 detects an electromagnetic wave that has passed through the first subsequent-stage optical system 19, that is, an electromagnetic wave that has travelled in the third direction d3, and outputs a detection signal.

The first detection unit 20 may be arranged with respect to the separation unit 16 such that a second travelling axis of an electromagnetic wave that travels in the second direction d2 from the separation unit 16 and that is caused to travel in the third direction d3 by the switching unit 18 is parallel to a second detection axis of the first detection unit 20. The second travelling axis is the central axis of an electromagnetic wave that travels in the third direction d3 from the switching unit 18 and that propagates while spreading radially. In the present embodiment, the second travelling axis is an axis that is obtained by extending the optical axis of the incident unit 15 to the switching unit 18 and bending the optical axis at the switching unit 18 to make it parallel to the third direction d3. The second detection axis is an axis that passes through the center of a detection surface of the first detection unit 20 and that is perpendicular to the detection surface.

The first detection unit 20 may be arranged in such a manner that the gap between the second travelling axis and the second detection axis is equal to or less than a second gap threshold. The second gap threshold may be the same as or different from the first gap threshold. Alternatively, the first detection unit 20 may be disposed in such a manner that the second travelling axis and the second detection axis coincide with each other. In the present embodiment, the first detection unit 20 is disposed in such a manner that the second travelling axis and the second detection axis coincide with each other.

The first detection unit 20 may be arranged with respect to the separation unit 16 such that a second angle formed by the second travelling axis and the detection surface of the first detection unit 20 is equal to or less than a second-angle threshold or such that the second angle is the same as a predetermined angle. The second-angle threshold may be the same as or different from the first-angle threshold. In the present embodiment, the first detection unit 20 is disposed in such a manner that the second angle is 90 degrees.

In the present embodiment, the first detection unit 20 is an active sensor that detects a reflected wave of an electromagnetic wave radiated from the radiation unit 12 toward the object ob. For example, the first detection unit 20 includes a single element, examples of which include an avalanche photodiode (APD), a photodiode (PD), and a distance-measurement image sensor. The first detection unit 20 may include an element array, examples of which include an APD array, a PD array, a distance-measurement imaging array, and a distance-measurement image sensor.

In the present embodiment, the first detection unit 20 transmits, as a signal, detection information indicating that a reflected wave has been detected to the control unit 14. More specifically, the first detection unit 20 detects an electromagnetic wave in the infrared band.

In the present embodiment, the first detection unit 20 is used as a detection element for measuring a distance to the object ob. In other words, the first detection unit 20 is an element included in a distance-measurement sensor, and an image is not necessarily formed at the detection surface of the first detection unit 20 as long as the first detection unit 20 can detect an electromagnetic wave. Thus, the first detection unit 20 does not need to be disposed at a second image-forming position that is a position at which an image is formed by the first subsequent-stage optical system 19. That is to say, in this configuration, the first detection unit 20 may be disposed at any position on a path of an electromagnetic wave that travels by passing through the first subsequent-stage optical system 19 after being caused by the switching unit 18 to travel in the third direction d3 as long as the first detection unit 20 is disposed at a position where an electromagnetic wave can be incident on the detection surface thereof from all angles of view.

With a configuration such as that described above, the electromagnetic-wave detection apparatus 10 matches a predetermined position in a space in image information with the optical axis of a reflected wave for measuring a distance to the predetermined position.

Figure 3:
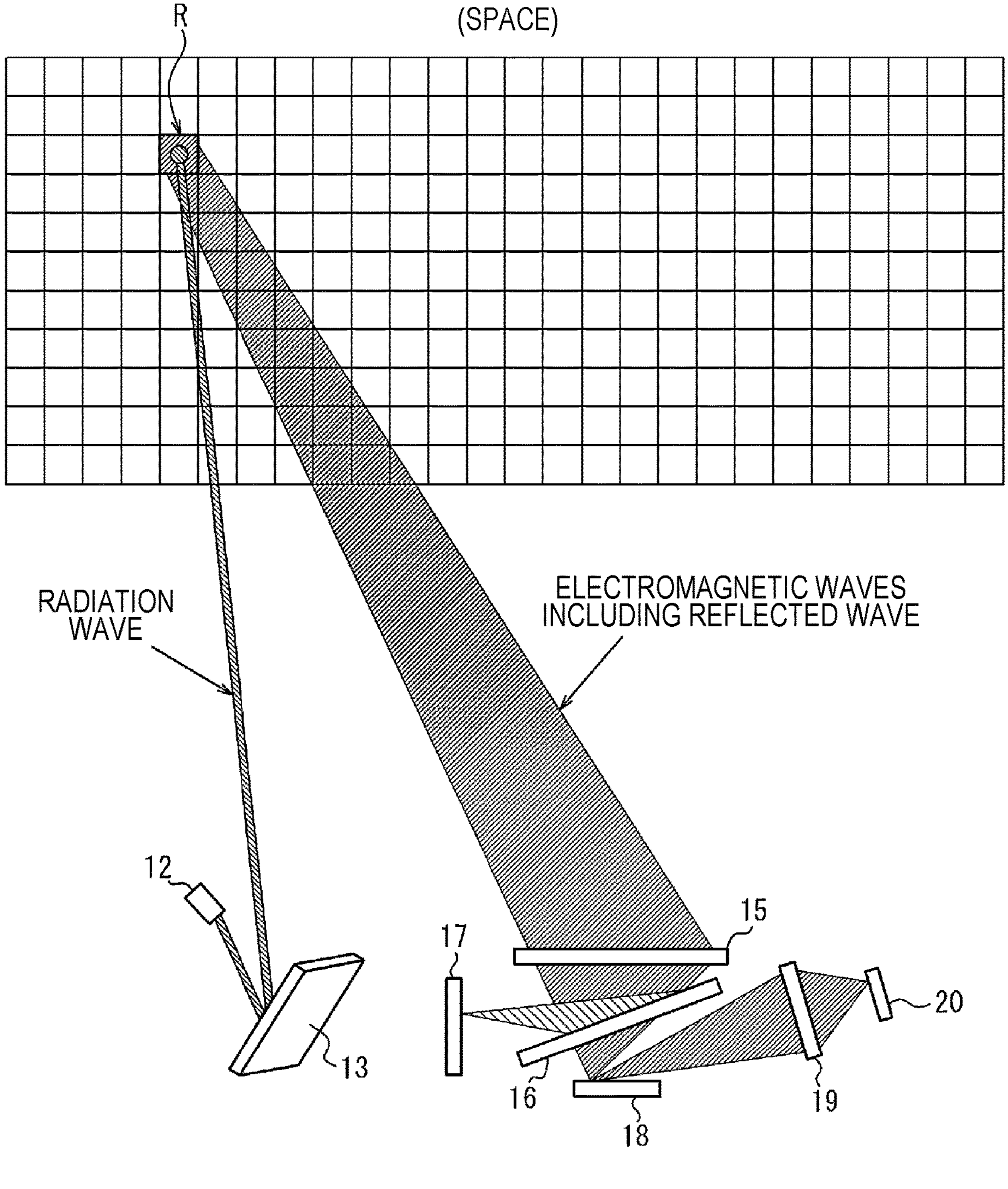
FIG. 3 is a diagram for describing detection of electromagnetic waves including a reflected wave.

FIG. 3 is a diagram for describing detection of the electromagnetic waves including a reflected wave. In FIG. 3, the space in which the object ob is present is divided by the number of times per frame the radiation system 111 radiates an electromagnetic wave and partitioned in a grid-like pattern. In general, the time taken to detect the electromagnetic waves including a reflected wave for one frame is longer than the time taken for an imaging device or the like to acquire an image for one frame. As an example, an imaging device can acquire 30 frames of captured images each having 1920×1080 pixels per second. In contrast, the time taken to perform distance measurement by receiving a reflected wave of the radiated electromagnetic wave may sometimes be about several μs to about 10 μs for one point depending on the distance to be measured. Thus, the number of locations (the number of points) at which range information is acquired by receiving a reflected wave from the space is smaller than 1920×1080 per frame.

In the case illustrated in FIG. 3, an electromagnetic wave beam radiated from the radiation unit 12 is reflected by the deflection unit 13 and is radiated into one region R of the space as the radiation wave. In the present embodiment, the radiation wave is an infrared ray. The electromagnetic waves including a reflected wave that is reflected by the object ob present in the region R are incident on the incident unit 15. In the present embodiment, the reflected wave is an infrared ray. In addition, the electromagnetic waves including a reflected wave include visible light that is outside light reflected by the object ob present in the region R. The separation unit 16 reflects the visible light, which is part of the electromagnetic waves including a reflected wave, in the first direction d1. The reflected visible light is detected by the second detection unit 17. In addition, the separation unit 16 enables an infrared ray, which is part of the electromagnetic waves including a reflected wave, to pass therethrough in the second direction d2. The infrared ray that has passed through the separation unit 16 is reflected by the switching unit 18, and at least a part of the infrared ray travels in the third direction d3. The infrared ray travelling in the third direction d3 passes through the first subsequent-stage optical system 19 and is detected by the first detection unit 20.

(Control Unit)

The image-information acquisition unit 141 acquires image information of the space in which the object ob is present from the second detection unit 17, which detects an electromagnetic wave from the space. The image-information acquisition unit 141 may generate a captured image (see FIG. 8) obtained by capturing an image of the space on the basis of the image information.

The radiation control unit 143 controls the radiation system 111. For example, the radiation control unit 143 causes the radiation system 111 to radiate an electromagnetic wave and to stop radiation of the electromagnetic wave. For example, the radiation control unit 143 causes the deflection unit 13 to change a direction in which the deflection unit 13 reflects an electromagnetic wave. The radiation control unit 143 may acquire image information or a captured image from the image-information acquisition unit 141 and use it for controlling the radiation system 111.

The calculation unit 145 calculates a distance to the object ob on the basis of detection information acquired by the first detection unit 20. The calculation unit 145 can calculate a distance by, for example, the time-of-flight (ToF) method on the basis of acquired detection information.

Figure 4:
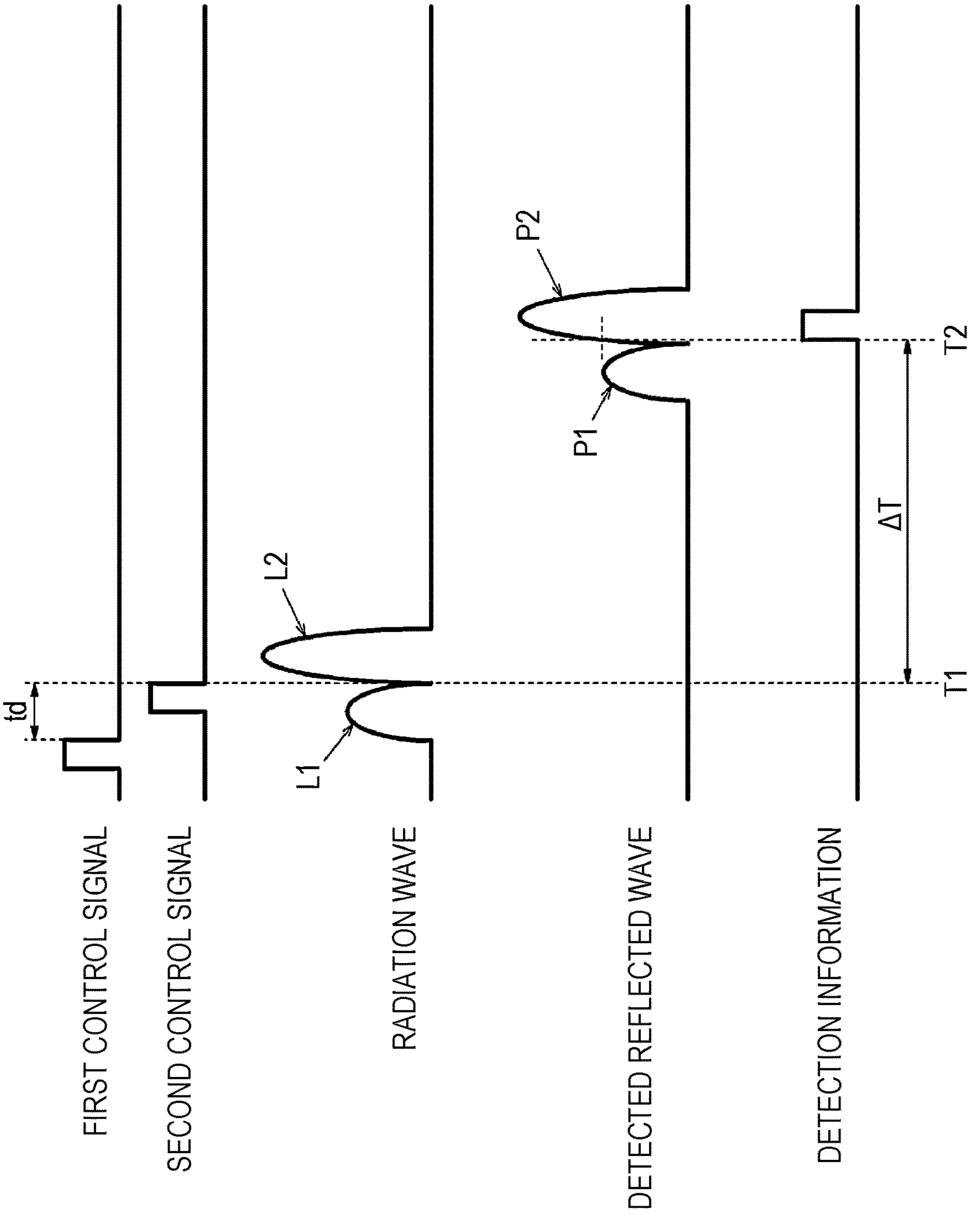
FIG. 4 is a diagram illustrating an example of a radiation wave and an example of a reflected wave.

FIG. 4 is a diagram illustrating an example of a radiation wave and an example of a reflected wave. In FIG. 4, a diagram illustrating a first electromagnetic wave L1 and a second electromagnetic wave L2 illustrates a timing at which an electromagnetic wave is radiated and changes in the intensity of the electromagnetic wave, and a diagram illustrating a first reflected wave P1 and a second reflected wave P2 illustrates a timing at which an electromagnetic wave is detected by the first detection unit 20 and the intensity of the detected electromagnetic wave, and an electromagnetic-wave detection signal output by the first detection unit 20 may correspond to this. Similarly, in FIG. 4, a diagram illustrating a first control signal and a diagram illustrating a second control signal each illustrate a timing at which the radiation control unit 143 causes the radiation unit 12 to output an electromagnetic wave, and a diagram illustrating detection information illustrates a timing at which the first detection unit 20 detects an electromagnetic wave (the same applies to FIG. 5 to FIG. 7). In the present embodiment, the first control signal for causing the radiation system 111 to radiate the first electromagnetic wave L1 and the second control signal for causing the radiation system 111 to radiate the second electromagnetic wave L2 are input to the radiation system 111 from the radiation control unit 143. The first control signal and the second control signal are input to a light-source driving device that is included in the radiation unit 12. Details of the light-source driving device will be described later. The second control signal is input to the light-source driving device after a predetermined time interval (time interval td in FIG. 4) has elapsed since the first control signal has been input to the light-source driving device. As an example, the time interval td is 3 ns to 10 ns. If the time interval td is increased, the interval between the first electromagnetic wave L1 and the second electromagnetic wave L2, which are pulsed radiation waves, increases. In other words, if the time interval td is increased, the time lag between radiation of the second electromagnetic wave L2 performed by the radiation system 111 and radiation of the first electromagnetic wave L1 performed by the radiation system 111 further increases.

As illustrated in FIG. 4, the radiation control unit 143 causes the second electromagnetic wave L2 with a greater output than the first electromagnetic wave L1 to be radiated after the first electromagnetic wave L1 has been radiated. The first electromagnetic wave L1 and the second electromagnetic wave L2 are reflected by the object ob and detected as the first reflected wave P1 and the second reflected wave P2, respectively, by the first detection unit 20. The first reflected wave P1 is a reflected wave of the first electromagnetic wave L1, that is, a reflected wave generated as a result of the first electromagnetic wave L1 being reflected by the object ob. The second reflected wave P2 is a reflected wave of the second electromagnetic wave L2, that is, a reflected wave generated as a result of the second electromagnetic wave L2 being reflected by the object ob. The time interval td is controlled in accordance with a minimum distance that is set to be measurable by the by the calculation unit 145 such that the second electromagnetic wave L2 is radiated from the radiation system 111 before the first electromagnetic wave L1 is reflected by the object ob and detected as the first reflected wave P1. The calculation unit 145 calculates a distance to the object ob on the basis of the second reflected wave P2 when the first detection unit 20 does not become saturated even with the second reflected wave P2. The distance calculation uses a period of time ΔT from time T1 at which the radiation unit 12 radiates the second electromagnetic wave L2 to time T2 at which the first detection unit 20 acquires detection information of the second reflected wave P2. Time T2 is the time at which the pulsed second reflected wave P2 rises to 50% of its peak. As another example, time T2 may be the time at which the second reflected wave P2 reaches its peak. In the case where the first detection unit 20 does not become saturated, using the second reflected wave P2 having a signal intensity greater than that of the first reflected wave P1 facilitates accurate detection of the time T2, and the accuracy of distance calculation can be improved.

The calculation unit 145 acquires information regarding the above-mentioned signal including detection information. The calculation unit 145 includes, for example, a time-measurement large scale integrated circuit (LSI) and measures the period of time ΔT. The calculation unit 145 calculates a distance to the irradiation position by multiplying the period of time ΔT by the speed of light and dividing it by two.

Here, the control unit 14 may include one or more processors. The one or more processors may load a program from an accessible memory and operate as the image-information acquisition unit 141, the radiation control unit 143, and the calculation unit 145. The one or more processors may include at least one of a general-purpose processor that executes a specific function by loading a specific program and a dedicated processor for specific processing. The dedicated processor may include an application specific integrated circuit (ASIC). The one or more processors may include a programmable logic device (PLD). The PLD may include a field-programmable gate array (FPGA). The control unit 14 may include at least one of a system-on-a-chip (SoC) in which one or more processors cooperate with each other and a system-in-a-package (SiP).

(Radiation Control)

Although FIG. 4 illustrates the case where the first detection unit 20 does not become saturated, there is a possibility that the first detection unit 20 will become saturated or will become unable to detect two reflected waves by being influenced by, for example, a distance to the object ob, the shape and the color of the object ob, or the like. In order to cope with such a case, the control unit 14 executes a radiation control method, which will be described below, so as to enable accurate measurement of a distance to the object ob.

First, in the case of acquiring range information at one point, the radiation control unit 143 causes the radiation system 111 to radiate multiple electromagnetic waves such that the magnitudes of the outputs of the multiple electromagnetic waves gradually increase. In other words, as illustrated in FIG. 4, the radiation control unit 143 causes the second electromagnetic wave L2 to be radiated before a reflected wave of the first electromagnetic wave L1 (i.e., the first reflected wave P1) is incident on the first detection unit 20. That is to say, after causing the first electromagnetic wave L1 to be radiated, the radiation control unit 143 causes the second electromagnetic wave L2 to be radiated before the first detection unit 20 becomes able to detect the first reflected wave P1. Then, the first detection unit 20 detects reflected waves of the multiple electromagnetic waves and outputs detection information on the basis of one of the detections. The detection information is generated at the timing at which one of the reflected waves is detected, and as will be described later, the reflected wave that is detected at the timing changes in accordance with the saturation state of the first detection unit 20 and the states of the waveforms of the reflected waves. Here, in the present embodiment, although the radiation system 111 radiates two electromagnetic waves, the number of the electromagnetic waves radiated from the radiation system 111 is not limited to two. In the case of acquiring range information at one point, the radiation control unit 143 may cause the radiation system 111 to radiate three or more electromagnetic waves such that the magnitudes of the outputs of the three or more electromagnetic waves gradually increase.

Figure 5:
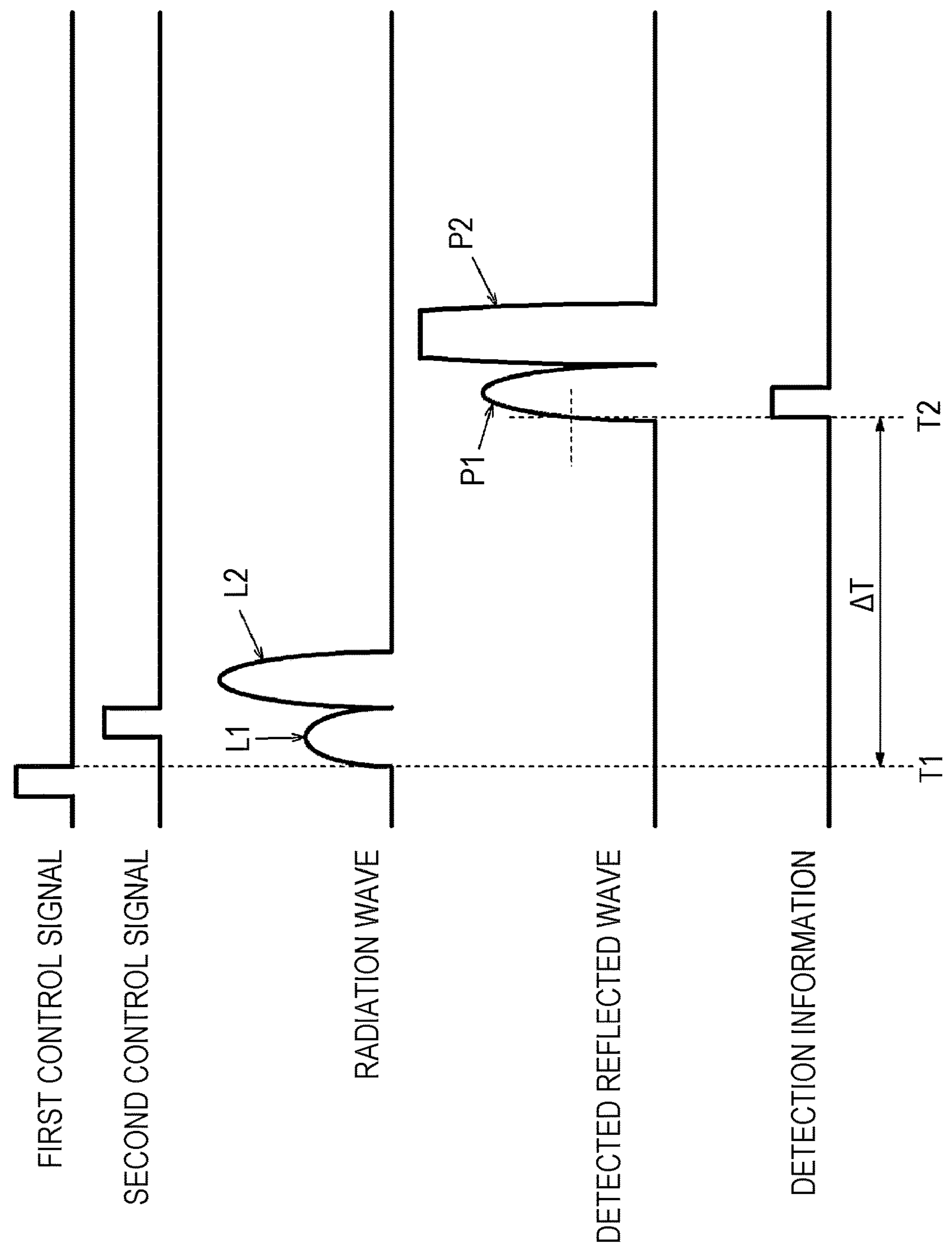
FIG. 5 is a diagram illustrating the case of saturation.

FIG. 5 is a diagram illustrating the case of saturation. When the first detection unit 20 becomes saturated with the reflected wave of the second electromagnetic wave L2, the calculation unit 145 calculates a distance to the object ob on the basis of the first reflected wave P1. In other words, when the first detection unit 20 becomes saturated with reflected waves of the multiple electromagnetic waves radiated from the radiation system 111, the calculation unit 145 performs distance measurement by using the reflected wave acquired immediately before the reflected wave that has saturated the first detection unit 20. By using the reflected wave acquired before the first detection unit 20 becomes saturated, the distance to the object ob can be calculated without being affected by the saturation. Here, the phrase "being affected by the saturation" refers to the case in which the saturated first detection unit 20 becomes unstable for, for example, several tens of ns to several hundreds of ns and cannot accurately detect reflected waves. In the case illustrated in FIG. 5, the first detection unit 20 becomes saturated with the second reflected wave P2. Consequently, the peak of the second reflected wave P2 cannot be determined, and the timing at which the reflected wave is used in measurement of a distance to the object ob (e.g., the time at which the second reflected wave P2 rises to 50% of its peak or the time at which the second reflected wave P2 reaches its peak) cannot be determined. However, the calculation unit 145 can perform accurate distance measurement without being affected by the saturation by using the timing at which the first electromagnetic wave L1 is radiated and the timing at which the first reflected wave P1 is detected. In other words, the distance calculation uses the period of time ΔT from time T1 at which the radiation unit 12 radiates the first electromagnetic wave L1 to time T2 at which the first detection unit 20 acquires detection information of the first reflected wave P1. Here, in the case where multiple reflected waves have been incident on the first detection unit 20 before the reflected wave that has saturated the first detection unit 20, the distance measurement is preferably performed by using the reflected wave that is incident on the first detection unit 20 immediately before the reflected wave that has saturated the first detection unit 20. This is because distance calculation can be performed with high accuracy by using the reflected wave having the largest signal intensity among the reflected waves incident on the first detection unit 20 before the saturation.

Figure 6:
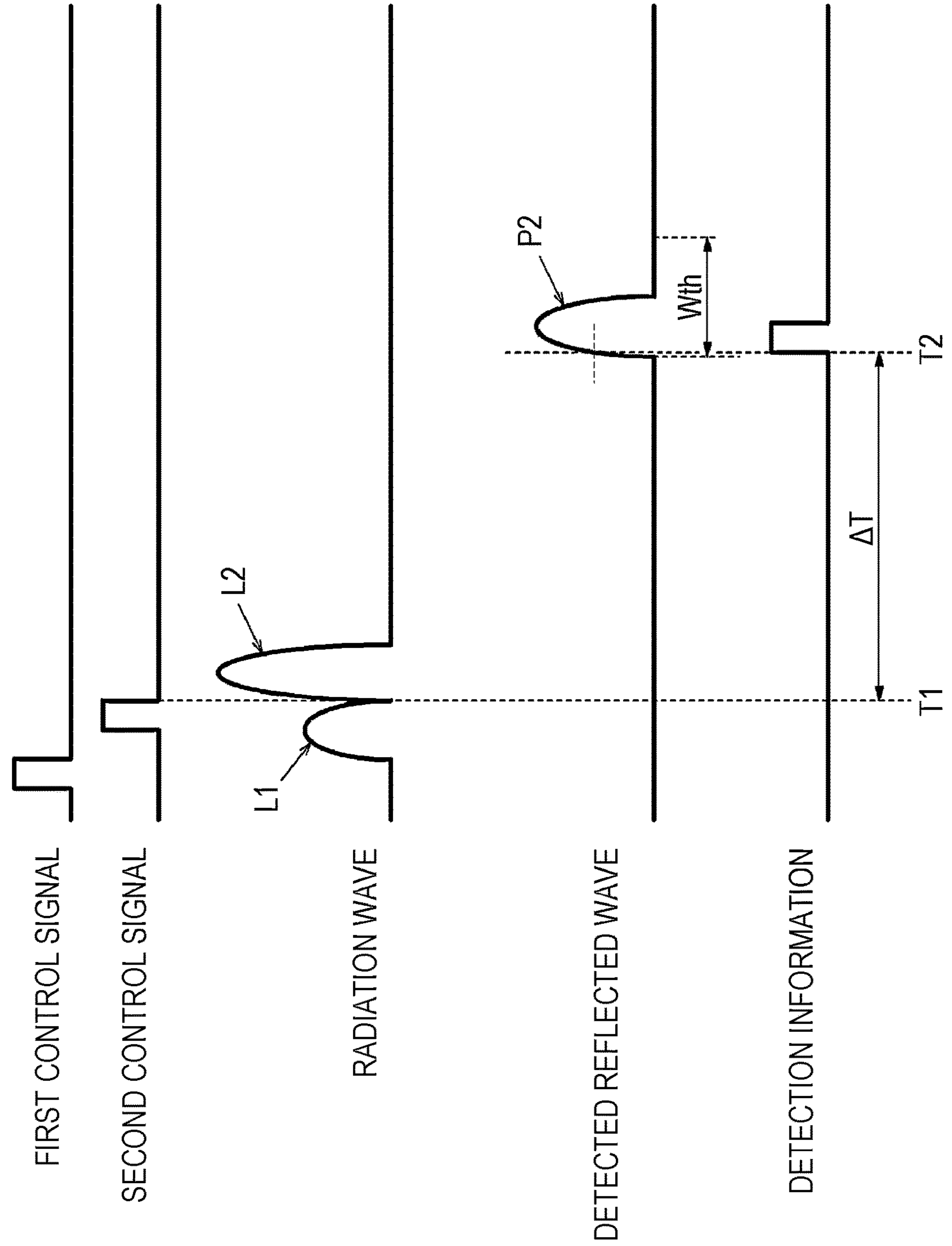
FIG. 6 is a diagram illustrating the case in which a single reflected wave is detected.

FIG. 6 is a diagram illustrating the case in which a single reflected wave is detected. The number of reflected waves that are detected usually matches the number of pulses of an electromagnetic wave that is radiated, and the pulse width of a detection signal of a reflected wave (hereinafter sometimes referred to as width of a reflected wave) has a predetermined length corresponding to the pulse width of the radiated electromagnetic wave. The width of a reflected wave appears in the waveform of a detection signal of an electromagnetic wave output by the first detection unit 20. In the case where the first electromagnetic wave L1 and the second electromagnetic wave L2 are radiated from the radiation unit 12, if the first detection unit 20 detects a single reflected wave reflected by the object ob, and the width of the reflected wave is narrow, the calculation unit 145 can calculate a distance to the object ob while considering the reflected wave as a reflected wave of the second electromagnetic wave L2. Here, the phrase "the width of the reflected wave is narrow" refers to the case in which the width is the width of a single reflected wave rather than the width of a wide reflected wave (see FIG. 7) formed of two reflected waves, such as those mentioned below, overlapping each other. For example, the radiation control unit 143 sets a threshold Wth, and the radiation control unit 143 may determine the width of a reflected wave to be narrow when the width is less than the threshold Wth and may output the determination result to the calculation unit 145. The threshold Wth may be set to, for example, the sum of the widths of two reflected waves reflected by the normal object ob. Here, the normal object ob is one of the objects ob excluding an object, such as a road, that is inclined with respect to an optical axis and is typically the object ob that is perpendicular to the optical axis of an electromagnetic wave radiated by the radiation unit 12. The state, such as that illustrated in FIG. 6, in which a single reflected wave having a narrow width has been detected seems to be the state in which a reflected wave of an electromagnetic wave with a low output does not reach a detectable intensity level. Thus, the calculation unit 145 presumes that this reflected wave is a reflected wave of the second electromagnetic wave L2, which is an electromagnetic wave with a high output. Therefore, measurement of a distance to the object ob can be performed by using the period of time ΔT from time T1 at which the radiation unit 12 radiates the second electromagnetic wave L2 to time T2 at which the first detection unit 20 acquires detection information of the reflected wave, which is presumed to be the second reflected wave P2.

The radiation control unit 143 may sometimes adjust the time interval between radiation of the first electromagnetic wave L1 and radiation of the second electromagnetic wave L2 on the basis of detection results that are obtained by the first detection unit 20 and that relate to the first reflected wave P1 and the second reflected wave P2. In particular, in the case where the first electromagnetic wave L1 and the second electromagnetic wave L2 are radiated from the radiation unit 12, if the first detection unit 20 detects a single reflected wave reflected by the object ob, and the width of the reflected wave is wide, the radiation control unit 143 increases the time interval between radiation of the first electromagnetic wave L1 and radiation of the second electromagnetic wave L2. Here, the phrase "the width of the reflected wave is wide" refers to the case in which the waveform of a detection signal that is obtained by the first detection unit 20 and that relates to the reflected wave has a width wider than that of a detection signal that relates to a single reflected wave, which is usually detected. Unlike the case illustrated in FIG. 6, the single reflected wave detected in this case is generated as a result of two or more reflected waves (the first reflected wave P1 and the second reflected wave P2 in the present embodiment) overlapping each other. Therefore, the width of this reflected wave is equal to or greater than the threshold Wth. The radiation control unit 143 may perform control so as to increase the time interval between radiation of the first electromagnetic wave L1 and radiation of the second electromagnetic wave L2 on the basis of the number of times the radiation is performed and the number of times a reflected wave is detected. In other words, if the radiation control unit 143 causes the radiation system 111 to continuously perform radiation multiple times including radiation of the first electromagnetic wave L1 and radiation of the second electromagnetic wave L2, and the number of times the first detection unit 20 detects a reflected wave is smaller than the number of times the radiation system 111 performs radiation of the electromagnetic wave, the radiation control unit 143 may increase the time interval between the radiations performed by the radiation system 111. This is because there is a possibility that detection signals of some of the reflected waves may be combined when the number of detected reflected waves is smaller than the number of times radiation of the electromagnetic wave is performed.

Figure 7:
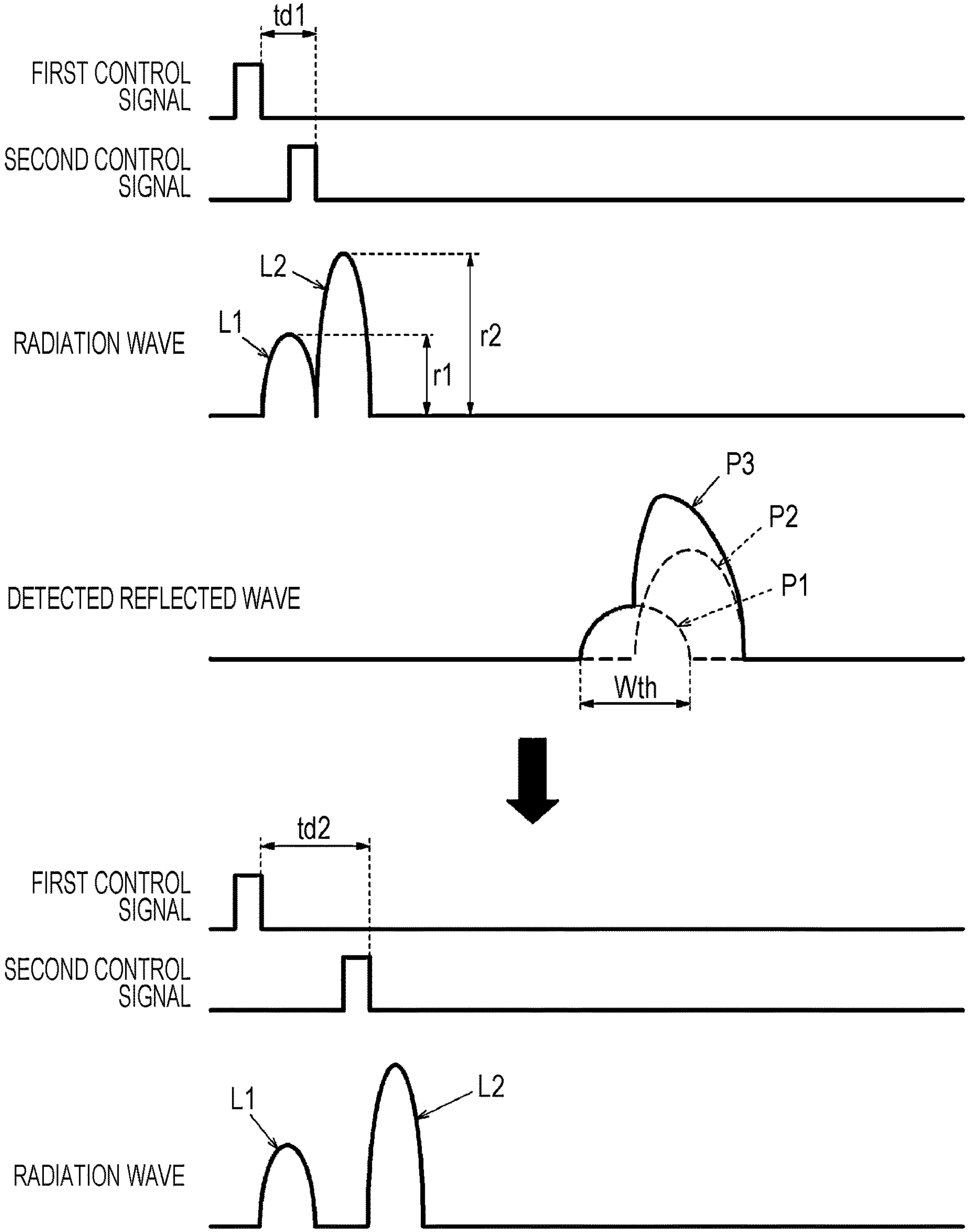
FIG. 7 is a diagram illustrating the case in which reflected waves overlap each other.
Figure 8:
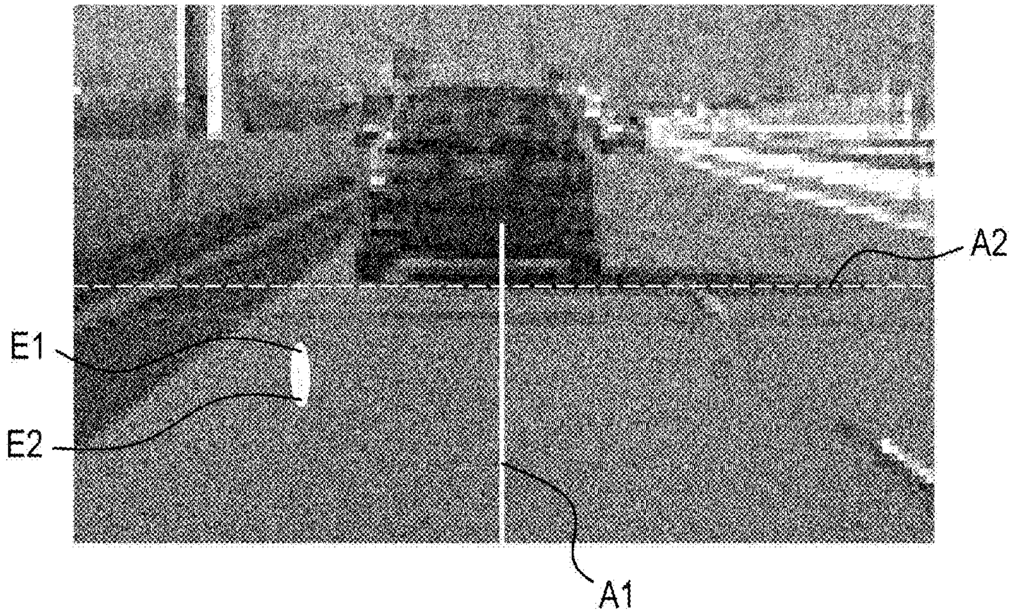
FIG. 8 is a diagram illustrating the case in which overlapping of reflected waves occurs.

FIG. 7 is a diagram illustrating the case in which reflected waves overlap each other. FIG. 8 is a diagram illustrating the case in which the electromagnetic-wave detection apparatus 10 is mounted on a vehicle and in which overlapping of reflected waves, such as that illustrated in FIG. 7, occurs. A reflected wave P3 illustrated in FIG. 7 is generated as a result of the first reflected wave P1 and the second reflected wave P2, each of which has a large width, overlapping each other. More specifically, the fall portion of a detection signal of the first reflected wave P1 and the rise portion of the second reflected wave P2 overlap each other, so that a single, wide detection signal is detected as a reflected wave. As illustrated in FIG. 8, the object ob includes an object such as, for example, a road that is inclined with respect to an optical axis. Here, an imaginary line A1 is a line corresponding to the optical axis in image information. When an electromagnetic wave beam is radiated onto such an object ob, a reflected wave that is the electromagnetic wave beam reflected by a portion E2 located closer to the radiation unit 12 is incident on the first detection unit 20 before a reflected wave that is the electromagnetic wave beam reflected by a portion E1 located farther from the radiation unit 12 is incident on the first detection unit 20. Thus, the wide first reflected wave P1 and the wide second reflected wave P2 are generated. In the case where the single reflected wave P3, which is formed of the overlapped first and second reflected waves P1 and P2, is detected, the radiation control unit 143 increases the time interval between radiation of the first electromagnetic wave L1 and radiation of the second electromagnetic wave L2 by changing a time interval td1 between the first control signal and the second control signal to a time interval td2 that is larger than the time interval td1. As a result, the probability that the first reflected wave P1 and the second reflected wave P2 will overlap each other can be reduced. Here, the time interval td1 is, for example, 3 ns. The time interval td2 is, for example, 10 ns.

Here, by identifying, on the basis of image information, the object ob irradiated with an electromagnetic wave, it can be determined whether there is a possibility that the reflected wave P3, which is formed of the overlapped first and second reflected waves P1 and P2, will be generated. Accordingly, the radiation control unit 143 may adjust the time interval between radiation of the first electromagnetic wave L1 and radiation of the second electromagnetic wave L2 on the basis of image information received from the image-information acquisition unit 141. The radiation control unit 143 may increase the time interval between radiation of the first electromagnetic wave L1 and radiation of the second electromagnetic wave L2 on the basis of the image information in the case where the electromagnetic wave is radiated onto one of the objects ob that is recognized as the object ob (e.g., a road, a guardrail, or the like) inclined with respect to the optical axis. In the image information illustrated in FIG. 8, a portion that is located below a horizontal center line A2 dividing the image into upper and lower halves is a road. Thus, in the case where the electromagnetic wave is radiated into the space in the downward direction, the radiation control unit 143 may increase the time interval between radiation of the first electromagnetic wave L1 and radiation of the second electromagnetic wave L2. Here, a lower portion of the space is not limited to the portion below the horizontal center line A2 in the image information of the space. The lower portion of the space may be, for example, the lower third of the image information of the space.

In addition, the radiation control unit 143 may adjust the first electromagnetic wave L1 and the second electromagnetic wave L2 on the basis of the range information that has already been acquired. For example, when the radiation unit 12 radiates an electromagnetic wave to multiple objects present in a space, and the ratio or the difference between the distance to one of the objects and the distance to another one of the objects is large, the radiation control unit 143 may increase the ratio of magnitude of output between the first electromagnetic wave L1 and the second electromagnetic wave L2 (the ratio between r1 and r2 in FIG. 7). More specifically, when the ratio between the distance to the farthest object among the multiple objects, which are present in the space, and the distance to the closest object among the multiple objects is equal to or greater than a predetermined ratio, the ratio of magnitude of output between the first electromagnetic wave L1 for one frame and the second electromagnetic wave L2 for one frame that are radiated into the space may be increased. Alternatively, when the difference between the distance to the farthest object and the distance to the closest object is equal to or greater than a predetermined value, the difference of magnitude of output between the first electromagnetic wave L1 for one frame and the second electromagnetic wave L2 for one frame that are radiated into the space may be increased. The output magnitude r2 of the second electromagnetic wave L2 is relatively large, so that a reflected wave came from a distant place can be incident on the first detection unit 20 while having a detectable intensity. In addition, the output magnitude r1 of the first electromagnetic wave L1 is relatively small, so that a reflected wave came from a nearby place can be incident on the first detection unit 20 while having an intensity with which the first detection unit 20 will not become saturated. When a space into which an electromagnetic wave is radiated includes an object having a high reflectance of electromagnetic waves and an object having a low reflectance of electromagnetic waves (e.g., a white object and a black object), and the difference between their reflectances is equal to or greater than a predetermined value, the radiation control unit 143 may increase, on the basis of image information, the ratio or the difference of magnitude of output between the first electromagnetic wave L1 and the second electromagnetic wave L2, which are radiated into the space, in order to accommodate variations in the reflectances of objects, which are distance measurement targets (i.e., variations of the intensities of reflected waves). Here, the reflectances of the objects can be determined on the basis of the luminances of the images of the multiple objects included in the image information before the first electromagnetic wave L1 and the second electromagnetic wave L2 are radiated.

(Light-Source Driving Device)

In order to generate multiple electromagnetic waves such that the magnitudes of the outputs of these electromagnetic waves gradually increase, the radiation unit 12 may include a light-source driving device, which will be described below.

Figure 9:
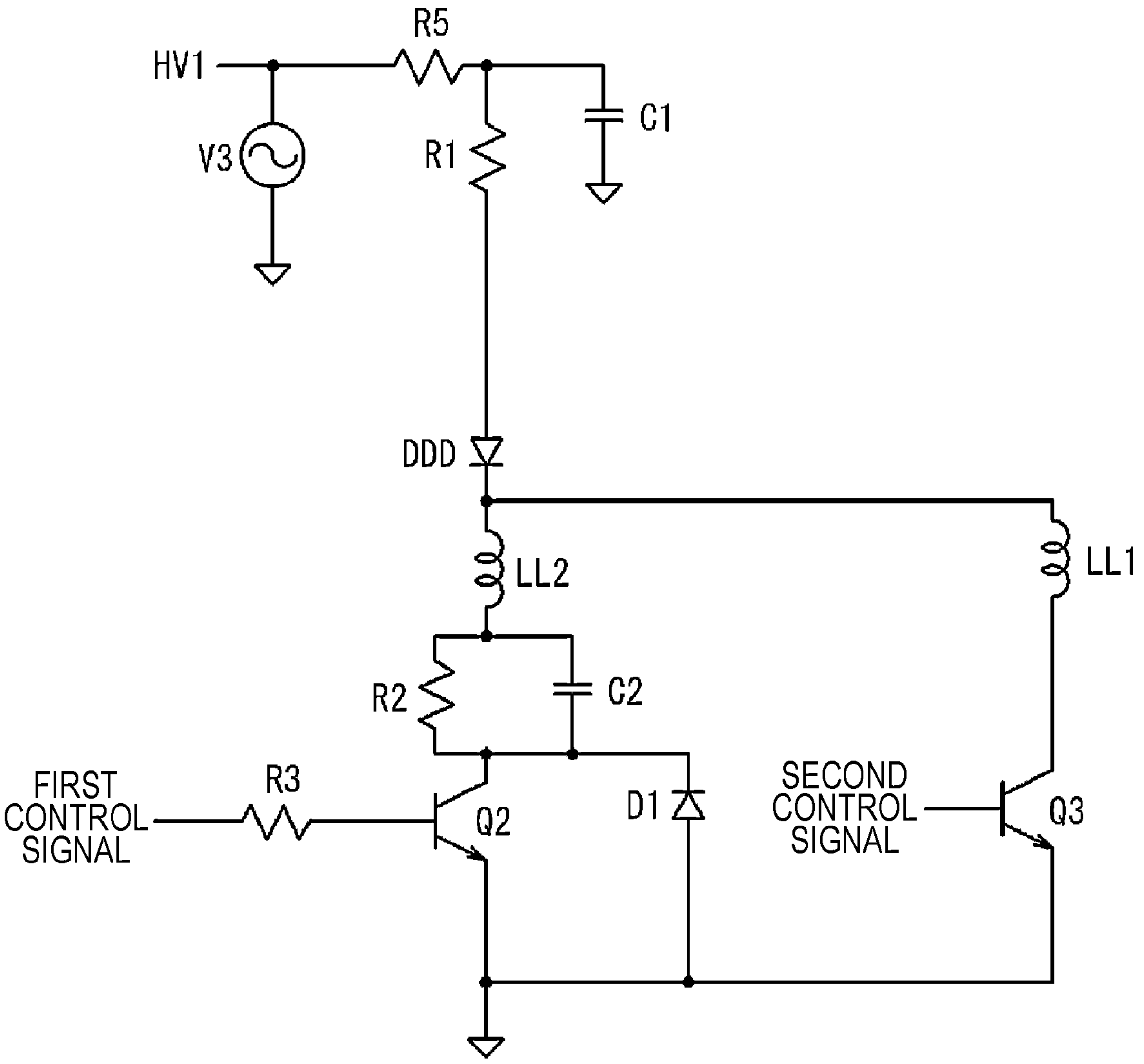
FIG. 9 is a diagram illustrating a circuit configuration of a light-source driving device.

FIG. 9 is a diagram illustrating a circuit configuration of a light-source driving device. The light-source driving device includes a laser diode DDD that mainly emits pulsed light, a capacitor C1 connected to the laser diode DDD so as to be capable of supplying a current to the laser diode DDD, a first transistor Q2, and a second transistor Q3. These are connected to other components as illustrated in FIG. 9, so that the light-source driving device is formed.

In the light-source driving device, power is supplied to the capacitor C1 by an alternating-current power supply through a resistor R5, and as a result, an electric charge accumulates in the capacitor C1. Upon receiving the first control signal, the first transistor Q2 causes the capacitor C1 to discharge part of the electric charge so as to cause the laser diode DDD to emit light so that the first electromagnetic wave L1 is radiated. Upon receiving the second control signal, the second transistor Q3 causes the capacitor C1 to discharge the rest of the electric charge so as to cause the laser diode DDD to emit light so that the second electromagnetic wave L2 is radiated. Here, a capacitor C2 illustrated in FIG. 9 has a capacitance smaller than the capacitance of the capacitor C1. When the first control signal is received, part of the electric charge of the capacitor C1 accumulates in the capacitor C2, and thus, the capacitor C1 discharges only part of the electric charge. Although an inductance LL1 and an inductance LL2 are each a floating inductance, inductances for adjusting a light-emission pulse width may be provided at their positions.

As described above, according to the present embodiment, the electromagnetic-wave detection apparatus 10 can perform, with the above-described configuration, accurate electromagnetic-wave detection without being affected by saturation or the like. Therefore, the electromagnetic-wave detection apparatus 10 functioning as a distance-measurement apparatus can detect a distance to a subject accurately.

(Variations)

Although the present disclosure has been described with reference to the drawings and on the basis of the embodiment, it is to be noted that variations and various corrections can be easily made by those skilled in the art on the basis of the present disclosure. Therefore, it is to be noted that such variations and corrections are included in the scope of the present disclosure.

In the above-described embodiment, the electromagnetic-wave detection apparatus 10 is configured to generate range information by the Direct ToF method for directly measuring the period of time from when a laser beam is radiated until the laser beam returns. However, the electromagnetic-wave detection apparatus 10 is not limited to having such a configuration. For example, the electromagnetic-wave detection apparatus 10 may generate range information by the Flash ToF method, in which an electromagnetic wave is radiated at regular intervals and in which the period of time from when the electromagnetic wave is radiated until the electromagnetic wave returns is indirectly measured by using the phase difference between the radiated electromagnetic wave and the returned electromagnetic wave.

Alternatively, the electromagnetic-wave detection apparatus 10 may employ another ToF method such as, for example, the phased ToF method and generate range information.

In the above-described embodiment, although the switching unit 18 can switch the travelling direction of an electromagnetic wave that is incident on the action surface as between two directions, the switching unit 18 may switch the travelling direction of the electromagnetic wave between three or more directions instead of two directions.

In the above-described embodiment, in the switching unit 18, the first state is the first reflection state in which an electromagnetic wave that is incident on the action surface as is reflected in the third direction d3, and the second state is the second reflection state in which an electromagnetic wave that is incident on the action surface as is reflected in the fourth direction d4. However, each of these states may be another state.

For example, the first state may be a transmission state in which an electromagnetic wave that is incident on the action surface as is allowed to pass through the action surface as and travel in the third direction d3. More specifically, switching elements included in a switching unit 181 that is an alternative to the above-described switching unit 18 and that has a configuration different from that of the switching unit 18 may each include a shutter having a reflective surface at which an electromagnetic wave is reflected in the fourth direction d4. In the switching unit 181 having such a configuration, the state of each of the switching elements may be switched between the transmission state, which is the first state, and the reflection state, which is the second state, by opening and closing the shutter of the switching element.

An example of the switching unit 181 having such a configuration may be a switching unit that includes a MEMS shutter in which multiple shutters that are openable and closable are arranged in an array. Another example of the switching unit 181 may be a switching unit that includes a liquid-crystal shutter whose state can be switched, in accordance with the alignment of liquid-crystal molecules, between a reflection state in which an electromagnetic wave is reflected and a transmission state in which an electromagnetic wave is allowed to pass therethrough. In the switching unit 181 having such a configuration, the state of each of the switching elements may be switched between the transmission state, which is the first state, and the reflection state, which is the second state, by switching the alignment of liquid-crystal molecules of the switching element.

In the electromagnetic-wave detection apparatus 10, the light reception system 110 may further include a second subsequent-stage optical system and a third detection unit. The second subsequent-stage optical system is disposed in the fourth direction d4 from the switching unit 18 and forms an image of the object ob. The third detection unit is disposed on a path of an electromagnetic wave that is caused to travel in the fourth direction d4 by the switching unit 18 and that further travels by passing through the second subsequent-stage optical system, and the third detection unit detects an electromagnetic wave that has travelled in the fourth direction d4.

In the above-described embodiment, the electromagnetic-wave detection apparatus 10 has a configuration in which the second detection unit 17 is a passive sensor and in which the first detection unit 20 is an active sensor. However, the electromagnetic-wave detection apparatus 10 is not limited to having such a configuration. For example, in the electromagnetic-wave detection apparatus 10, advantageous effects the same as, and/or similar to, those of the above-described embodiment can be obtained both in the case where the second detection unit 17 and the first detection unit 20 are active sensors and in the case where the second detection unit 17 and the first detection unit 20 are passive sensors.

In the present embodiment, the calculation unit 145 measures a distance to the object ob, and the electromagnetic-wave detection apparatus 10 has a function of serving as a distance-measurement apparatus. Here, the electromagnetic-wave detection apparatus 10 is not limited to being configured to measure a distance. For example, the electromagnetic-wave detection apparatus 10 may be a driver-assistance apparatus that detects the presence of the object ob, which is an obstacle on a road, and gives a warning. In this case, the control unit 14 does not need to include the calculation unit 145. As another example, the electromagnetic-wave detection apparatus 10 may be a surveillance apparatus that detects the presence of the object ob, which is a suspicious object in the surroundings.

Among the image-information acquisition unit 141, the radiation control unit 143, and the calculation unit 145, some of them may be provided separately from the control unit 14 instead of being included in the control unit 14. For example, the calculation unit 145 may be provided as a control device that is independent of the control unit 14.

Although a representative example has been described in the above embodiment, it is obvious to those skilled in the art that many changes and substitutions can be made within the gist and the scope of the present disclosure. Thus, the present disclosure shall not be considered to be limited to the above-described embodiment, and variations and various changes can be made without departing from the scope of the claims. For example, some of the configuration blocks illustrated in the configuration diagrams of the embodiment can be combined into a single configuration block, or one of the configuration blocks may be divided into multiple configuration blocks.

Although a solution of the present disclosure is described in the form of an apparatus, the present disclosure can also be realized in forms including the apparatus and furthermore can be realized as a method, a program, or a storage medium recording a program that is substantially equivalent to the apparatus, and it shall be understood that the scope of the present disclosure includes these forms as well.

REFERENCE SIGNS

10 electromagnetic-wave detection apparatus
12 radiation unit
13 deflection unit
14 control unit
15 incident unit
16 separation unit
17 second detection unit
18, 181 switching unit
19 first subsequent-stage optical system
20 first detection unit
110 light reception system
111 radiation system
141 image-information acquisition unit
143 radiation control unit
145 calculation unit
as action surface
d1, d2, d3, d4 first direction, second direction, third direction, fourth direction
ob object

The invention claimed is:

1. An electromagnetic-wave detection apparatus comprising:

a radiation system configured to radiate an electromagnetic wave toward a space in which a target is present;

a first detection unit configured to detect a reflected wave that is the electromagnetic wave radiated by the radiation system and reflected by the target;

a calculation unit configured to calculate a distance to the target based on detection information that is obtained by the first detection unit and that relates to the reflected wave; and a radiation control unit configured to cause the radiation system to radiate the electromagnetic wave, wherein the radiation control unit causes a first electromagnetic wave to be radiated and then causes a second electromagnetic wave with a greater output than the first electromagnetic wave to be radiated, wherein the first detection unit detects the reflected wave of the first electromagnetic wave at a time before detecting the reflected wave of the second electromagnetic wave, and wherein the calculation unit calculates the distance to the target based on the reflected wave of the first electromagnetic wave upon the calculation unit determining that the first detection unit has become saturated with the reflected wave of the second electromagnetic wave.

2. The electromagnetic-wave detection apparatus according to claim 1, wherein the radiation control unit causes the second electromagnetic wave to be radiated before the reflected wave of the first electromagnetic wave is incident on the first detection unit.

3. The electromagnetic-wave detection apparatus according to claim 1, wherein the radiation control unit causes the first electromagnetic wave to be radiated and then causes the second electromagnetic wave to be radiated before the first detection unit becomes able to detect the reflected wave of the first electromagnetic wave.

4. The electromagnetic-wave detection apparatus according to claim 1, wherein the radiation control unit adjusts a time interval between radiation of the first electromagnetic wave and radiation of the second electromagnetic wave based on a detection result relating to the reflected wave of the first electromagnetic wave and a detection result relating to the reflected wave of the second electromagnetic wave, the detection results being obtained by the first detection unit.

5. The electromagnetic-wave detection apparatus according to claim 4, wherein the radiation control unit increases the time interval between radiation of the first electromagnetic wave and radiation of the second electromagnetic wave when one of the reflected wave of the first electromagnetic wave reflected by the target and the reflected wave of the second electromagnetic wave reflected by the target is detected by the first detection unit.

6. The electromagnetic-wave detection apparatus according to claim 4, wherein, if the radiation control unit causes the radiation system to perform radiation of the electromagnetic wave multiple times including radiation of the first electromagnetic wave and radiation of the second electromagnetic wave, and a number of times the first detection unit detects the reflected wave is smaller than a number of times the radiation system performs radiation of the electromagnetic wave, the radiation control unit increases the time interval between the radiations of the electromagnetic waves performed by the radiation system.

7. The electromagnetic-wave detection apparatus according to claim 1, further comprising:

a second detection unit configured to detect light from the space and output image information of the space, wherein the radiation control unit adjusts a time interval between radiation of the first electromagnetic wave and radiation of the second electromagnetic wave based on the image information.

8. The electromagnetic-wave detection apparatus according to claim 7, wherein, when an object among one or more targets that is inclined with respect to an optical axis is irradiated with the electromagnetic wave, the radiation control unit increases the time interval between radiation of the first electromagnetic wave and radiation of the second electromagnetic wave based on the image information.

9. The electromagnetic-wave detection apparatus according to claim 7, wherein the radiation control unit increases a difference of magnitude of output between the first electromagnetic wave and the second electromagnetic wave based on a luminance of the target included in the image information.

10. The electromagnetic-wave detection apparatus according to claim 1, wherein, when a difference between a distance to a position of one of multiple objects present in the space and a distance to a position of another one of the multiple objects is large, the radiation control unit increases a difference of magnitude of output between the first electromagnetic wave and the second electromagnetic wave.

11. The electromagnetic-wave detection apparatus according to claim 1, wherein, when a number of the reflected waves detected by the first detection unit is one, and the single reflected wave has a pulse width smaller than a predetermined width, the calculation unit calculates the distance to the target while considering the reflected wave as the reflected wave of the second electromagnetic wave.

12. The electromagnetic-wave detection apparatus according to claim 1, wherein the electromagnetic-wave detection apparatus is configured to be mounted on a vehicle, and wherein, when the space includes a first region and a second region located below the first region, and the electromagnetic wave is radiated toward the second region, the radiation control unit increases a time interval between radiation of the first electromagnetic wave and radiation of the second electromagnetic wave to be larger than the time interval between radiation of the first electromagnetic wave and radiation of the second electromagnetic wave when the electromagnetic wave is radiated toward the first region.

13. The electromagnetic-wave detection apparatus according to claim 1, wherein the radiation system includes a light-source driving device to which a first control signal for causing the radiation system to radiate the first electromagnetic wave and a second control signal for causing the radiation system to radiate the second electromagnetic wave are input from the radiation control unit, and wherein the light-source driving device includes a laser diode configured to emit pulsed light, a capacitor connected to the laser diode in such a manner as to be capable of supplying a current to the laser diode, a first transistor configured to cause, upon receiving the first control signal, part of electric charge accumulated in the capacitor to be discharged and cause the laser diode to emit light such that the first electromagnetic wave is radiated, and a second transistor configured to cause, upon receiving the second control signal, a remaining part of the electric charge of the capacitor to be discharged and cause the laser diode to emit light such that the second electromagnetic wave with an intensity greater than an intensity of the first electromagnetic wave is radiated.

14. The electromagnetic-wave detection apparatus according to claim 13, wherein the second control signal is input to the light-source driving device 3 ns to 10 ns after the first control signal has been input to the light-source driving device.

* * * * *